United States Patent [19]
Achtenberg et al.

[11] Patent Number: 4,774,112
[45] Date of Patent: Sep. 27, 1988

[54] USE OF SILICONE MASSES TO PREVENT THE FORMATION OF ICE ON SUBSTRATES

[75] Inventors: Theo Achtenberg, Leverkusen; Hans Sattlegger, Odenthal-Gloebusch, both of Fed. Rep. of Germany

[73] Assignee: Bayer Aktiengesellschaft, Leverkusen, Fed. Rep. of Germany

[21] Appl. No.: 928,998

[22] Filed: Nov. 10, 1986

[30] Foreign Application Priority Data

Nov. 21, 1985 [DE] Fed. Rep. of Germany ....... 3541100

[51] Int. Cl.$^4$ .............................................. B05D 3/02
[52] U.S. Cl. ...................................... 427/387; 252/70; 106/13
[58] Field of Search ........................... 427/387; 106/13

[56] References Cited

U.S. PATENT DOCUMENTS 4,554,187 11/1985 Grape et al. ....................... 427/387

FOREIGN PATENT DOCUMENTS 3323909 1/1985 Fed. Rep. of Germany .

Primary Examiner—Thurman K. Page
Assistant Examiner—L. R. Horne
Attorney, Agent, or Firm—Connolly & Hutz

[57] ABSTRACT

A method of minimizing the adherence of ice on substrates which comprises coating said substrates with a polysiloxane composition which changes into a rubbery elastic material in the presence of water or atmospheric moisture which comprises $\alpha,\omega$-dihydroxy-polydiorganosiloxane having a viscosity of about 500 to 2,000,000 centipoise at 20° C. and a cross-linking agent with or without a hardening catalyst.

2 Claims, No Drawings

USE OF SILICONE MASSES TO PREVENT THE FORMATION OF ICE ON SUBSTRATES

The present invention relates to certain polysiloxane masses used to prevent the formation of ice on objects exposed to freezing conditions.

BACKGROUND OF THE INVENTION

Ice adheres to the surface of an object with enormous force due to the hydrogen bridges between the water and the surface. Frost and damage by ice occur in cold climatic zones and in various parts of the world during the winter. The many risks due to frost and icing include those at sea and in the air due to the formation of ice on ships and aircraft. This problem also occurs to a marked extent on drilling platforms in offshore regions. There has been no lack of attempts to prevent the formation of ice. Mechanical, thermal and chemical methods have been tested but all these have hitherto met with little success and have generally been much too expensive.

Previous attempts to prevent the formation of ice on the surface of objects by applying a coating composition have slightly reduced the tendency to ice formation. Known coating compositions used for this purpose predominantly contain acrylic resins, rubber, fluorine-containing resins, silicone resins, etc. Among these, the silicone resins are still the most suitable for producing certain improvements (see e.g. Chemical Abstracts, Volumne 93, 134 009p, U.S. Pat. No. 4,271,215, German Pat. No. 3,238,039). However, the formation of ice could not hitherto be reliably prevented.

BRIEF DESCRIPTION OF THE INVENTION

The present invention relates to the use of polysiloxane masses which change into rubbery elastic masses under the action of water or atmospheric moisture and are obtainable from the following components:

(A) $\alpha,\omega$-Dihydroxy-polydiorganosiloxanes having a viscosity of about 500 to 2,000,000 cP (20° C.), (B) optionally an $\alpha,\omega$-bis-(trimethylsiloxy)-polydimethylsiloxane, (C) a substance having a cross-linking action, (D) optionally one or more adhesifying agents, (E) pigments and a filler which may or may not have a reinforcing action, (F) a hardening catalyst, and (G) optionally a solvent to prevent the formation of ice on substrates.

DETAILED DESCRIPTION

Pastes ready for use based on organopolysiloxanes have already been widely used for sealing joints. Such masses and the elastomer bodies obtained from them by cross-linking with atmospheric moisture constitute an ideal sealing substance for many different purposes. The classical examples of such so-called one-component systems are described, for example, in French Pat. No. 1,188,495, German Pat. No. 1,247,646, and W. Noll, "Chemie und Technologie der Silicone", 1966, Verlag Chemie, Weinheim, Chapter 8.1, in particular pages 341 and 342.

It has surprisingly been found that such masses have very little power of adherence to ice compared with other materials.

Due to the excellent hydrophobic action of these substances, formation of compact ice is to a large extent prevented and any coarse crystalline ice adhering to the substances can be removed by a fairly strong wind or rapidly drops off due to its loose structure and weak adherence.

In addition, these masses have the advantage that they can be diluted with a wide variety of solvents (anhydrous) and can be applied to the surface relatively rapidly and inexpensively, e.g. by spraying.

The important advantage of the masses used according to the invention, however, compared with the known materials which are relatively rigid and hard, is that when cured they constitute a highly elastic substance which is capable of absorbing quite large movements (from about ±20% to ±50%, depending on their composition) without any loss in functional efficiency. This elasticity is particularly advantageous in facilitating the removal of parts of ice from the underlying surface.

The vulcanizates are insensitive to a wide variety of environmental influences such as UV radiation, moisture, sea water and high and low temperatures. Their mechanical characteristics therefore remain unchanged over very long periods of time which is, of course, a great advantage when the substances are used, for example, on an offshore drilling platform.

Practical fields of application in the offshore region include (a) drilling platforms,
(b) drilling ships,
(c) escort vessels and
(d) supply ships.

The above mentioned application of the masses according to the invention provides a considerable lowering in cost (saving of energy) since the formation of ice in critical areas, e.g. on a drilling platform, had hitherto to be prevented by electric heating.

The cold-setting one-component silicone systems used according to the invention normally contain the following components:

1. An $\alpha,\omega$-dihydroxy-diorganosiloxane in which the organo group would normally be a methyl or phenyl group. A halogen alkyl group such as chloromethyl, an alkenyl group such as vinyl or a cycloalkyl group such as a cyclohexyl group may also be present in minor proportions. The viscosity of these dihydroxy-polydiorganosiloxanes is in the region of about 500 to 2,000,000 cP (20° C.), depending on the requirements of the end product. Such homo-, hetero- or copolymers generally constitute about 10 to 90% by weight of the total quantity of paste.

2. Plasticizers as additives, e.g. $\alpha,\omega$-trialkyl-siloxypolydiorganic siloxane having a viscosity of 10 to 1,000,000 cP (20° C.).

3. The cross-linking substances are polyfunctional organosilicon compounds containing more than two functional groups.

When the one-component silicone pastes used according to the invention are prepared by mixing the various substances listed under (A)–(G), the substances used as cross-linking agents may be bound to the polymer either during the mixing process or during storage or in a form of premix by splitting off one of the reactive groups. These organosilicon compounds may be of the following kind:

(a) corresponding to the formula $$R_y SiX_{4-y}$$

where y=0 or 1.

In this formula, R may be an alkyl, alkenyl, aryl or halogenated alkyl, alkenyl or aryl group, and X is a reactive group capable of reacting with a silanol group of component (1). The reactive group may be, for example, an alkoxy, acyloxy, amino, acid amide or oxime group. Alkyltriacetoxysilanes are preferred.

(b) Di-, tri- and polysiloxanes formed by partial hydrolysis from the silanes mentioned under (a) as indicated by the formula for the disiloxane:

$$R_y X_{33-y}-Si-O-Si-X_{3-y}-R_y$$

as represented by (C) in German Pat. No. 1,794,197.

4. Fillers (charged or uncharged) of a general kind used singly or in most cases as mixtures, e.g. reinforcing fillers (highly disperse silica produced by flame hydrolysis, titanium dioxide, carbon black, etc.) or fillers such as powdered quartz, chalk (natural and precipitated), synthetic resin powder and pigments of all kinds, e.g. iron oxide pigments.

5. Various kinds of auxiliary substances, e.g. the silanes described under paragraph 2., above, containing aminoalkyl, epoxyalkyl or other reactive alkyl groups.

(a) additives, acting, for example, as drying agents, e.g. complex titanic acid esters (see e.g. German Pat. No. 1,258,087)

(b) additives acting, for example, as adhesifying agents, e.g. hexamethyldisiloxane (see U.S. Pat. No. 4,419,484 or European No. 57,878 B1) or di-tert.-butoxydiacetoxysilane. Primers may also be used to improve adherence.

(c) Catalysts to accelerate the reaction, e.g. organic tin compounds or, for example, amino compounds.

(d) Suitable solvent additives are mainly those which do not react with the cross-linking substance, e.g. xylene, petroleum hydrocarbon fractions or, for example, isododecane or different mixtures of the various solvents to enable the substance used according to the invention to be adjusted, for example so that it can be sprayed on a wide variety of different surfaces.

The polysiloxane masses may be prepared in known manner in planet mixers, dissolvers or other suitable mixing apparatus.

Xylene and isododecane are preferred solvents.

The quantity of solvent used generally amounts to about 5 to 85% by weight, based on the total quantity of coating compound, preferably 35 to 55% by weight. Under certain accurately specified conditions, however, the process may also be carried out solvent-free.

The coating may be applied, for example, by spraying, spread coating, immersion or casting. The coating is preferably applied by a so-called airless spraying process.

Preparation of the substances to be used according to the invention and their application are described in more detail in the following examples (percentages are percentages by weight unless otherwise indicated).

EXAMPLE 1

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP. was introduced into the reaction vessel. 5 parts by weight of ethyltriacetoxysilane and 0.9 parts by weight of di-tert.-butoxy-diacetoxysilane were added at room temperature and the mixture was briefly stirred. 9 parts by weight of finely disperse silica and 0.4 parts by weight of iron oxide pigment were then added and the mixture was stirred under vacuum until homogeneous. 0.02 parts by weight of a catalyst (dibutyl tin diacetate) was then added and the mixture stirred under vacuum until homogeneous. 60 parts by weight of xylene were finally added and the mixture again stirred until homogeneous. A vacuum was briefly applied at the end.

The mass was then filled into containers and if kept free from moisture could be stored for half a year without any deterioration in the capacity for vulcanization or in the adherence when the mass was subsequently used as anti-icing mass.

This mass can be applied by spraying, for example by the airless spraying technique.

The following examples illustrate the same properties as regards storage and application.

EXAMPLE 2

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP., were introduced into the reaction vessel. 5 parts by weight of methyl triacetoxysilane were added at room temperature and the mixture was briefly stirred. 9 parts by weight of finely disperse silica and 0.4 parts by weight of iron oxide pigment were then added and the mixture was stirred under vacuum until homogeneous. 0.01 part by weight of a catalyst (dibutyl tin diacetate) was then added and the mixture stirred under vacuum until homogeneous. 60 parts by weight of isooctane were finally added and stirred in until homogeneous. A vacuum was briefly applied at the end.

EXAMPLE 3

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP. and 2 parts by weight of hexamethyldisiloxane were introduced into the reaction vessel. 15 parts by weight of vinyl triacetoxysilane were added at room temperature and the mixture was briefly stirred. 9 parts by weight of finely disperse silica and 0.4 parts by weight of iron oxide pigment were then added and the mixture was stirred under vacuum until homogeneous. 0.01 part by weight of a catalyst (dibutyl tin diacetate) was then added and the mixture stirred under vacuum until homogeneous. 60 parts by weight of isododecane were finally added and the mixture stirred until homogeneous. Finally, a vacuum was briefly applied.

EXAMPLE 4

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP., was introduced into the reaction vessel. 5 parts by weight of ethyl triacetoxysilane were added at room temperature and the mixture was briefly stirred. 9 parts by weight of finely disperse silica and 0.4 parts by weight of iron oxide pigment were then added and the mixture was stirred under vacuum until homogeneous. 0.02 parts by weight of a catalyst (dibutyl tin diacetate) was then added and stirred in under vacuum until the mixture was homogeneous. 60 parts by weight of xylene were finally added and the mixture was stirred until homogeneous. A vacuum was briefly applied at the end.

EXAMPLE 5

A mixture of 60 parts by weight α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP., and 2 parts by weight of hexamethyldisiloxane was introduced into the reaction vessel. 5 parts by weight of ethyltriacetoxysilane were added at room temperature and the mixture was briefly stirred. 9 parts by weight of finely disperse silica and 0.4 parts by weight of iron oxide pigment were then added and the mixture was stirred under vacuum until homogeneous. 1.0 part by weight of a complex titanic acid ester (di-butoxy-diacetoacetic ester titanate) was then added and the mixture was briefly stirred. 0.03 Parts by weight of a catalyst (dibutyl tin diacetate) were then added and the mixture was stirred under vacuum until homogeneous. 60 parts by weight of xylene were finally added and the mixture stirred until homogeneous. A vacuum was briefly applied at the end.

EXAMPLE 6

A mixture of 35 parts by weight of α,ω-dihydroxypolydimethylsiloxane, viscosity at 20° C. of 50,000 cP., and 8 parts by weight of α,ω-bis-(trimethylsiloxy)-polydimethylsiloxane, viscosity at 20° C. of 1400 cP., was introduced into the reaction vessel. 4.5 parts by weight of a complex titanic acid ester (dibutoxy-diacetoacetic-ester titanate) were added at room temperature and the mixture was stirred. 4.5 parts by weight of a finely disperse silica and 40 parts by weight of a chalk were incorporated (finally under vacuum). 1.2 parts by weight of an iron oxide pigment and 1.4 parts by weight of a catalyst (dibutyl tin dilaurate) were then stirred in. 4 parts by weight of bis-(N-methylbenzamido)-ethoxy-methylsilane were then added. 50 parts by weight of isododecane were finally added and the mixture stirred until homogeneous. A vacuum was briefly applied at the end.

EXAMPLE 7

A mixture of 34 parts by weight of α,ω-dihydroxypolydimethylsiloxane, viscosity at 20° C. of 50,000 cP., and 34 parts by weight of α,ω-bis-(trimethylsiloxy)-polydimethylsiloxane, viscosity at 20° C. of 1400 cP., was introduced into the reaction vessel. 4 parts by weight of complex titanic acid ester (dibutoxy-diacetoacetic ester titanate), 2 parts by weight of methyltrimethoxy silane and 0.5 parts by weight of γ-glycidyloxypropyltrimethoxysilane were added and stirred in. 30 parts by weight of a chalk and 1.2 parts by weight of an iron oxide pigment were then added and the mixture was stirred. 4.5 parts by weight of a finely disperse silica were then stirred in (a vacuum was finally applied). 0.06 parts by weight of a catalyst (dibutyl tin diacetate) were then added and incorporated under vacuum. 50% by weight of a petroleum hydrocarbon fraction (Isopar H of Esso) were finally added and the mixture stirred until homogeneous. A vacuum was briefly applied at the end.

EXAMPLE 8

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP., and 2 parts by weight of hexamethyldisiloxane was introduced into the reaction vessel. 5 parts by weight of methyl-tris(2-butanoneoxime)-silane were added at room temperature and the mixture was briefly stirred. 8 parts by weight of finely disperse silica and 0.4 parts by weight of iron oxide pigment were then added and the mixture was stirred under vacuum until homogeneous. 0.5 parts by weight of γ-aminopropyl-triethoxysilane and 0.6 parts by weight of a catalyst (dibutyl tin dilaurate) were then added and the mixture was stirred under vacuum until homogeneous. 60 parts by weight of xylene were finally added and stirred in until the mixture was homogeneous, a vacuum being briefly applied at the end.

EXAMPLE 9

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP., and 2 parts by weight of hexamethyldisiloxane were introduced into the reaction vessel. 6 parts by weight of methyltributylaminosilane were added at room temperature and the mixture was briefly stirred. 13 parts by weight of a finely disperse silica and 0.4 parts by weight of iron oxide pigment were then added and the mixture was stirred until homogeneous. 20 parts by weight of xylene and 40 parts by weight of isododecane were finally added and the mixture stirred until homogeneous with brief application of a vacuum towards the end of the mixing process.

EXAMPLE 10

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP., and 2 parts by weight of hexamethyldisiloxane were introduced into the reaction vessel. 5 parts by weight of ethyl triacetoxysilane were added at room temperature and the mixture was briefly stirred. 9 parts by weight of finely disperse silica and 0.4 parts by weight of iron oxide pigment were then added and the mixture was stirred under vacuum until homogeneous. 0.02 parts by weight of a catalyst (dibutyl tin diacetate) were then added and the mixture was stirred under vacuum until homogeneous. 65 parts by weight of methylene chloride, based on the starting quantity, were finally added and stirred in until the mixture was homogeneous. A vacuum was briefly applied at the end.

EXAMPLE 11

A mixture of 60 parts by weight of α,ω-dihydroxypolydimethylsiloxane, viscosity at 20° C. of 50,000 cP., and 20 parts by weight of α,ω-bis-(trimethylsiloxy)-polydimethylsiloxane, viscosity at 20° C. of 1400 cP., was introduced into the reaction vessel. 5 parts by weight of ethyltriacetoxysilane and 0.9 parts by weight of di-tert.-butoxydiacetoxysilane were added at room temperature and the mixture was briefly stirred. 9 parts by weight of finely disperse silica and 0.4 parts by weight of iron oxide pigment were then added and the mixture was stirred under vacuum until homogeneous. 0.02 parts by weight of a catalyst (dibutyl tin diacetate) were then added and the mixture was stirred under vacuum until homogeneous. 65 parts by weight of 1,1,1-trichloroethane were then added, based on the starting quantity, and stirred in until the mixture was homogeneous. A vacuum was briefly applied at the end.

The following anti-icing experiments were carried out with the masses described above:

(1) Test in a climatic chamber

A layer of ice about 25 mm in thickness (from sea water) was produced at a temperature of −21° C. on a steel plate measuring 8×1000×1000 mm coated with the material according to Example 4. The plate was placed vertically. The thickness of the coating was 1.5 mm.

The temperature was maintained at −21° C. for a further 12 hours after the ice had formed so that all the ice could assume this temperature. The temperature in the chamber was then slowly raised (2° C./h).

At −10° C., the forces of adherence of the ice to the silicone rubber diminished to such an extent that the ice became detached and fell off, i.e. at −10° C. adherence between ice and the mass according to the invention was already eliminated.

The ice adhered very firmly to a vinyl coating used in practice and could only be removed at temperatures above 0° C.

(2) Test in a climatic chamber with simulation of natural environment (wind, temperature, water)

Several plates (1×500×500 mm) were again coated with the mass according to Example 1 (thickness of coating 1.5 mm) and tested in the climatic chamber (see Table 1)

TABLE 1

| Test No. | 1 | 2 | 3 | 4 | 5 | 6 |
|---|---|---|---|---|---|---|
| Wind velocity (m/s) | 1 | 12 | 1 | 12 | 1 | 12 |
| Air temperature (°C.) | −6 | −6 | −14 | −14 | −20 | −20 |
| Sea water temperature (°C.) | +4.5 | +4.5 | +4.5 | +4.5 | +4.5 | +4.5 |
| Diameter of drops of sea water (mm) | 0.1 | 0.1 | 0.1 | 0.1 | 0.1 | 0.1 |
| Spray frequency (s/s) | 2/5 | 2/5 | 2/5 | 2/5 | 2/5 | 2/5 |
| Water content/liquid | 1 | 1 | 1 | 1 | 1 | |

TABLE 1-continued

| Test No. | 1 | 2 | 3 | 4 | 5 | 6 |
|---|---|---|---|---|---|---|
| (g/m$^3$) | | | | | | |

The plates were set up at an angle of 15° which is close to the position occurring under practical conditions and promotes the formation of ice.

The test plates were inspected every hour so that the formation of ice on the surface could be recorded.

TABLE 2

| Test No. | Wind (m/s) | Air temp. °C. | Duration of test hrs | Ice thickness (mm) | Remarks |
|---|---|---|---|---|---|
| 1 | 1 | −6 | 4 | 0 | No ice, water sprayed from the plate |
| 2 | 12 | −6 | 9 | 0–4 | loose ice sludge in the water layer |
| 3 | 1 | −14 | 5 | 1–4 | hard ice easily removed by hand |
| 4 | 12 | −14 | 12 | 10–50 | hard, needle-shaped ice which was blown away by the wind after some time. The thin layer left behind could easily be removed by hand |
| 5 | 1 | −20 | 4 | 1–4 | hard ice, easily removed by hand |
| 6 | 12 | −20 | 2.5 | 2–4 | hard ice, easily removed by hand |
| 7 | 12 | −14 | 3 | 5–10 | hard ice, breaks cohesive in one piece when attempts are made at removal |

Table 2

Simulated climate, a coating according to Example 1 was tested in Test Nos. 1 to 6 and a standard vinyl coating was tested in Test No. 7.

This test clearly shows the advantage of a plate treated with the silicone mass compared with a surface treated with the vinyl coating conventionally used.

The ice was very readily removed from the plates treated with silicone rubber and was blown away by the wind when it reached a certain size.

On the vinyl coating used in practice (Test No. 7), by contrast, the forces of adherence were more powerful than the forces of cohesion so that a permanent layer of ice could form.

In Test No. 6, the plate was stored for a further 48 hours (without wind or sea water) after the test described above. At the end of that time, the ice was in equilibrium with its surroundings. Even after this treatment, no special change in the properties was observed and the ice could still be easily removed by hand.

What is claimed is:

1. A method of minimizing the adherence of ice on substrates which comprises coating said substrates with a polysiloxane composition which changes into a rubbery elastic material in the presence of water or atmospheric moisture which comprises $\alpha,\omega$-dihydroxy-polydiorgano-siloxane having a viscosity of about 500 to 2,000,000 centipoise at 20° C. and a cross-linking agent with or without a hardening catalyst, wherein the substrate is coated with the polysiloxane composition diluted with a water-free solvent.

2. The method according to claim 1, wherein the water-free solvent is hydrocarbon.

* * * * *